US008421367B2

(12) United States Patent
Tsai et al.

(10) Patent No.: US 8,421,367 B2
(45) Date of Patent: Apr. 16, 2013

(54) LIGHT-EMITTING DIODE LIGHT SOURCE AND LIGHT-EMITTING DIODE LAMP

(75) Inventors: Wen-Kuei Tsai, Taipei County (TW); Sheng-ho Chang, Changhua County (TW); Chun-Chien Wang, Taipei County (TW)

(73) Assignee: GE Investment Co., Ltd., Taipei (TW)

( * ) Notice: Subject to any disclaimer, the term of this patent is extended or adjusted under 35 U.S.C. 154(b) by 282 days.

(21) Appl. No.: 11/923,645

(22) Filed: Oct. 24, 2007

(65) Prior Publication Data

US 2009/0058317 A1 Mar. 5, 2009

(30) Foreign Application Priority Data

Aug. 27, 2007 (CN) .......................... 2007 1 0142445

(51) Int. Cl.
*H02J 7/00* (2006.01)

(52) U.S. Cl.
USPC ............................................ 315/291; 307/66

(58) Field of Classification Search ................ 307/1, 64, 307/66; 315/195, 291, 307
See application file for complete search history.

(56) References Cited

U.S. PATENT DOCUMENTS

| | | | | |
|---|---|---|---|---|
| 6,392,368 | B1 * | 5/2002 | Deller et al. | 315/317 |
| 6,841,947 | B2 * | 1/2005 | Berg-johansen | 315/169.3 |
| 7,852,009 | B2 * | 12/2010 | Coleman et al. | 315/185 S |
| 2002/0008976 | A1 * | 1/2002 | Gronemeier et al. | 362/545 |
| 2003/0039002 | A1 * | 2/2003 | Toriumi et al. | 359/113 |
| 2003/0221876 | A1 * | 12/2003 | Doczy et al. | 178/18.01 |
| 2004/0189218 | A1 * | 9/2004 | Leong et al. | 315/291 |
| 2005/0047134 | A1 * | 3/2005 | Mueller et al. | 362/231 |
| 2005/0122062 | A1 * | 6/2005 | Hsu | 315/291 |
| 2005/0125083 | A1 * | 6/2005 | Kiko | 700/19 |
| 2005/0200317 | A1 * | 9/2005 | Novikov | 315/312 |
| 2005/0212688 | A1 * | 9/2005 | Chung | 340/870.02 |
| 2005/0237005 | A1 * | 10/2005 | Maxik | 315/247 |
| 2005/0281030 | A1 * | 12/2005 | Leong et al. | 362/234 |
| 2006/0104291 | A1 * | 5/2006 | Rodriguez et al. | 370/401 |
| 2007/0007826 | A1 * | 1/2007 | Mosebrook et al. | 307/139 |
| 2008/0309255 | A1 * | 12/2008 | Myers et al. | 315/297 |

FOREIGN PATENT DOCUMENTS

| | | | |
|---|---|---|---|
| JP | 62121492 | A | 6/1987 |
| JP | 04101299 | A | 4/1992 |
| JP | 08069589 | A | 3/1996 |
| JP | 2002218571 | A | 8/2002 |
| JP | 2003150074 | A | 5/2003 |
| JP | 2005063803 | A | 3/2005 |
| JP | 2007165230 | A | 6/2007 |
| JP | 2007195161 | A | 8/2007 |
| WO | 2006068762 | A2 | 6/2006 |

OTHER PUBLICATIONS

English abstract of JP Pub. 2004-118747 to Shimizu, Display System Having Touch Panel.*

* cited by examiner

*Primary Examiner* — Danny Nguyen
(74) *Attorney, Agent, or Firm* — Stout, Uxa, Buyan & Mullins, LLP

(57) ABSTRACT

A light-emitting diode (LED) light source suitable for being electrically connected with a power line is provided. The LED light source includes an LED array, a power line communication (PLC) unit and a current control unit. The PLC unit is electrically connected with the power line, and the current control unit is electrically connected with the LED array and the PLC unit.

20 Claims, 4 Drawing Sheets

LIGHT-EMITTING DIODE LIGHT SOURCE AND LIGHT-EMITTING DIODE LAMP

CROSS-REFERENCE TO RELATED APPLICATION

This application claims the priority benefit of Chinese application serial no. 200710142445.3, filed on Aug. 27, 2007. All disclosure of the Chinese application is incorporated herein by reference.

BACKGROUND OF THE INVENTION

1. Field of the Invention

The present invention relates to an illumination system, and more particularly, to an illumination system having a power line communication unit (PLC unit).

2. Description of Related Art

LEDs are semiconductor devices. The light emitting chips are mainly made of a compound semiconductor material containing III-V group chemical elements, for example, GaP, GaAs, and the like, and function on the principle of converting electric energy to light. That is to say, the compound semiconductor is powered to release excessive energy through the combination of electrons and holes, so as to emit photon (light). The LED can emit light without being heated or does not discharge to emit light. Therefore, the lifespan of the LED is up to 100,000 hours, and an idling time is not required. In addition, the LED has advantages of quick response speed (approximately $10^{-9}$ seconds), small volume, power-saving, low pollution, high reliability, and ease mass production. Thus, the LEDs have been intensively used in many fields, for example, light source and illumination device in large-scale bulletin boards, traffic lights, cellular phones, scanners, fax machines, etc.

Currently, the light emitting brightness and efficiency of the LEDs are continuously improved, and meanwhile the white LEDs with high brightness are successfully put into mass production, so the white LEDs have been gradually used in illumination devices such as indoor illumination and outdoor street lamp. However, as for the outdoor street lamps, the LED street lamps are generally designed to have a simple illumination function instead of bringing other added values to the passers-by or administrators.

Furthermore, illumination of a common-use street lamp is usually a high pressure sodium (HPS) lamp. A voltage needed for driving the street lamp usually ranges between 4000 volts and 5000 volts, and a stabilizer is required to be installed in the HPS lamp; therefore, a production cost and overall weight are increased virtually. In addition, because the street lamp is often installed in an outdoor environment, how to keep the street lamp clean has been one of the most important topics in illumination of the street lamp.

SUMMARY OF THE INVENTION

The present invention is directed to a light emitting diode (LED) light source having a power line communication (PLC) unit.

The present invention is directed to an LED lamp having the aforesaid LED light source.

The present invention provides an LED light source suitable for being electrically connected with a power line. The LED light source includes an LED array, a PLC unit, and a current control unit, wherein the PLC unit is electrically connected with the power line, and the current control unit is electrically connected with the power line, the LED array, and the PLC unit.

The present invention further provides an LED lamp suitable for being connected with a power line. The LED lamp includes the aforesaid LED light source, a housing, a plastic lampshade and a photocatalyst layer. The housing and the plastic lampshade are provided for containing the LED array, the PLC unit and the current control unit. The photocatalyst layer is coated on the plastic lampshade.

According to an embodiment of the present invention, the aforesaid LED array includes a carrier and a plurality of LEDs. The LEDs are arranged in an array on the carrier and electrically connected with the carrier.

According to one embodiment of the present invention, the aforesaid carrier includes a circuit board.

According to an embodiment of the present invention, the aforesaid circuit board includes a metal core printed circuit board (MCPCB).

According to an embodiment of the present invention, the aforesaid PLC unit is integrated in the circuit board.

According to an embodiment of the present invention, the PLC unit is a PLC chip electrically connected with the circuit board.

According to an embodiment of the present invention, the aforesaid current control unit is integrated in the circuit board.

According to an embodiment of the present invention, the aforesaid LEDs include surface mounted device (SMD) type packages or pin through hole (PTH) type packages.

According to an embodiment of the present invention, the aforesaid PLC unit includes a high definition power line communication unit (HD-PLC unit).

According to an embodiment of the present invention, the aforesaid LED light source further includes a wireless communication unit electrically connected with the PLC unit. According to an embodiment of the present invention, the wireless communication unit includes an IEEE 802.15.4 ZigBee wireless communication unit or a worldwide interoperability for microwave access (WiMAX) wireless communication unit.

According to an embodiment of the present invention, the aforesaid LED light source may further include an image-capturing apparatus electrically connected with the PLC unit.

According to an embodiment of the present invention, the aforesaid PLC unit includes an Ethernet network port, and the image-capturing apparatus includes an IP camera electrically connected with the Ethernet network port.

According to the present invention, because the PLC unit is integrated in the LED light source or the LED lamp, the LED light source or the LED lamp of the present invention can communicate with other LED light sources or other LED lamps through the power line. In addition, the LED light source or the LED lamp of the present invention can also transmit data to a remote monitoring center through the power line.

In order to the make the aforementioned and other objects, features and advantages of the present invention more comprehensible, several embodiments accompanied with figures are described in detail below.

DESCRIPTION OF EMBODIMENTS

First Embodiment

Figure 1:
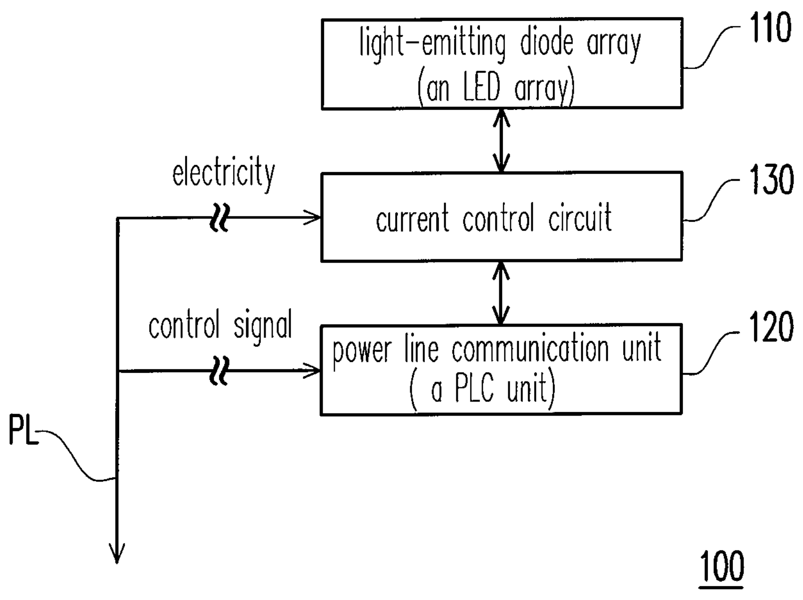
FIGS. 1 and 2 are schematic views illustrating a light emitting diode (LED) light source according to a first embodiment of the present invention.
Figure 2:
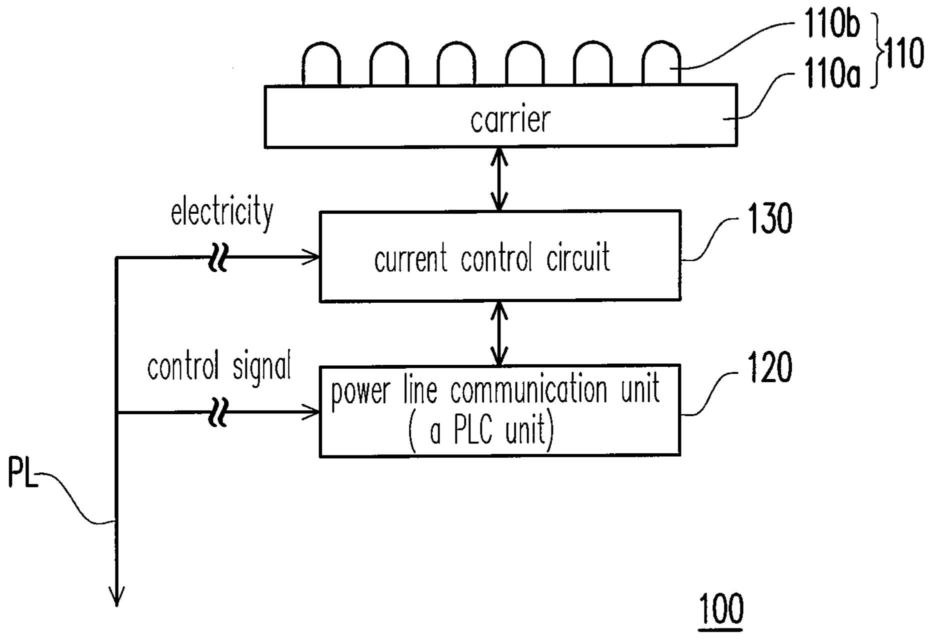

FIGS. 1 and 2 are schematic views illustrating a light emitting diode (LED) light source according to an embodiment of the present invention. Referring to FIG. 1, the LED light source 100 of the present invention includes an LED array 110, a power line communication (PLC) unit 120 and a current control unit 130. The current control unit 130 is electrically connected with a power line PL, the LED array 110 and the PLC unit 120. As shown in FIG. 1, the PLC unit 120 is connected with the power line PL, so as to receive a control signal transmitted from the power line PL. The PLC unit 120 controls the current control unit 130 to output a driving current to the LED array 110 according to the control signal, and thereby the LED array 110 can display determined brightness. Under some particular circumstances (e.g. an emergency), the PLC unit 120 even can control the current control unit 130 to output an over-driving current to the LED array 110, so that the LED array 110 can display ultra high brightness (the brightness ranges between 150% and 300% of normal brightness).

Referring to FIG. 2, the LED array 110 of the present invention is, for example, a chip on board (COB) type package. Certainly, the LED array 110 can also be other types of packages, such as a lead-frame type package and so forth. Taking the COB type package as an example, the LED array 110 includes a carrier 110*a* and a plurality of LEDs 110*b*. The LEDs 110*b* are arranged in an array on the carrier 110*a* and electrically connected with the carrier 110*a*. As shown in FIG. 2, the carrier 110*a* is a circuit board, for example. Generally, for good heat dissipation performance of the LED array 110, the carrier 110*a* can be a metal core printed circuit board (MCPCB) with the good heat dissipation performance. Certainly, the carrier 110*a* according to the present invention can also be other types of circuit boards, such as a circuit board having a heat sink, a heat pipe or other heat dissipation devices.

The LEDs 110*b* according to the present embodiment are, for example, surface mounted device (SMD) type packages or pin through hole (PTH) type packages. Of course, the LEDs 110*b* can also be other packages suitable for being connected with the carrier 110*a*.

The PLC unit 120 according to the present embodiment is, for example, a high definition PLC unit (HD-PLC unit). A transmission rate of the HD-PLC unit ranges from 42 Mbps to 72 Mbps, for example.

Second Embodiment

Figure 3A:
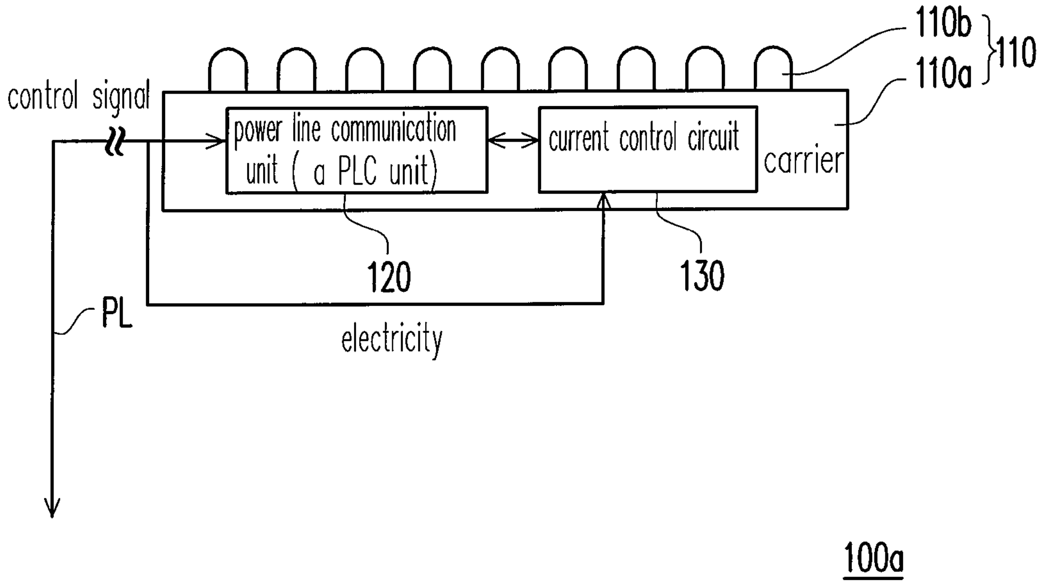
FIGS. 3A and 3B are schematic views illustrating an LED light source according to a second embodiment of the present invention.
Figure 3B:
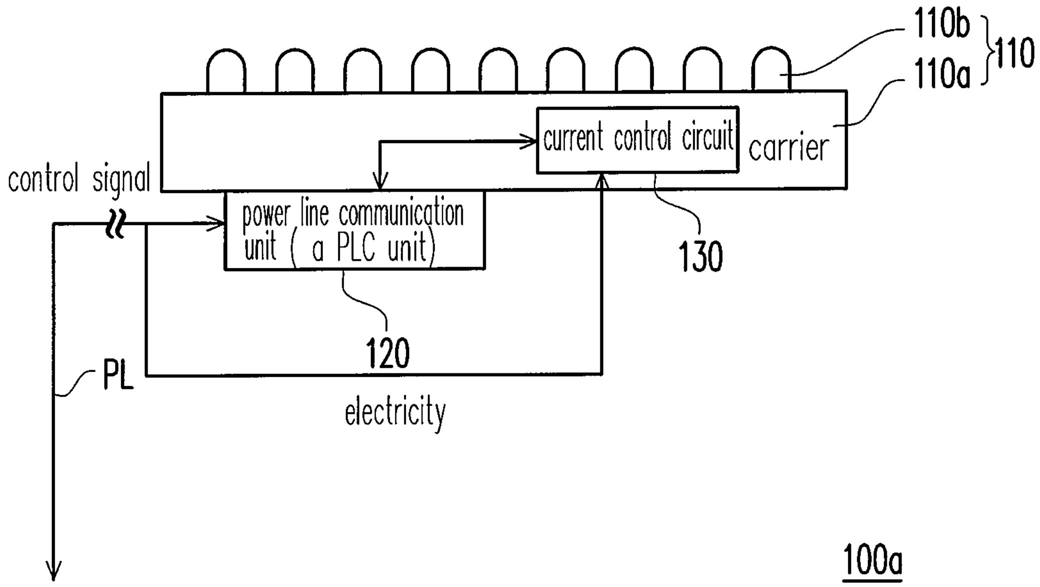

FIGS. 3A and 3B are schematic views illustrating an LED light source according to a second embodiment of the present invention. Referring to FIGS. 3A and 3B, since an LED array 110 according to the present embodiment is a COB type package, at least one of a PLC unit 120 and a current control unit 130 can be integrated in a carrier 110*a* (circuit board), and thereby the PCL unit 120 and the current control unit 130 are electrically connected to each other through the carrier 110*a* (circuit board). In other words, a designer can integrate the PLC unit 120 into the carrier 110*a* (circuit board) according to actual demands and dispose the current control unit 130 independently from the carrier 110*a* (circuit board). Of course, the designer can also integrate the current control unit 130 into the carrier 110*a* (circuit board) and dispose the PLC unit 120 independently from the carrier 110*a* (circuit board), as shown in FIG. 3B. Moreover, the designer can simultaneously integrate the PLC unit 120 and the current control unit 130 into the carrier 110*a* (circuit board), as shown in FIG. 3A.

Referring to FIG. 3B, when the PLC unit 120 is disposed independently from the carrier 110*a* (the circuit board), the PLC unit 120 is, for example, a PLC chip. The PLC chip is disposed on one of surfaces of the carrier 110*a* (circuit board) and electrically connected with the current control unit 130 through circuits in the carrier 110*a* (circuit board).

Third Embodiment

Figure 4:
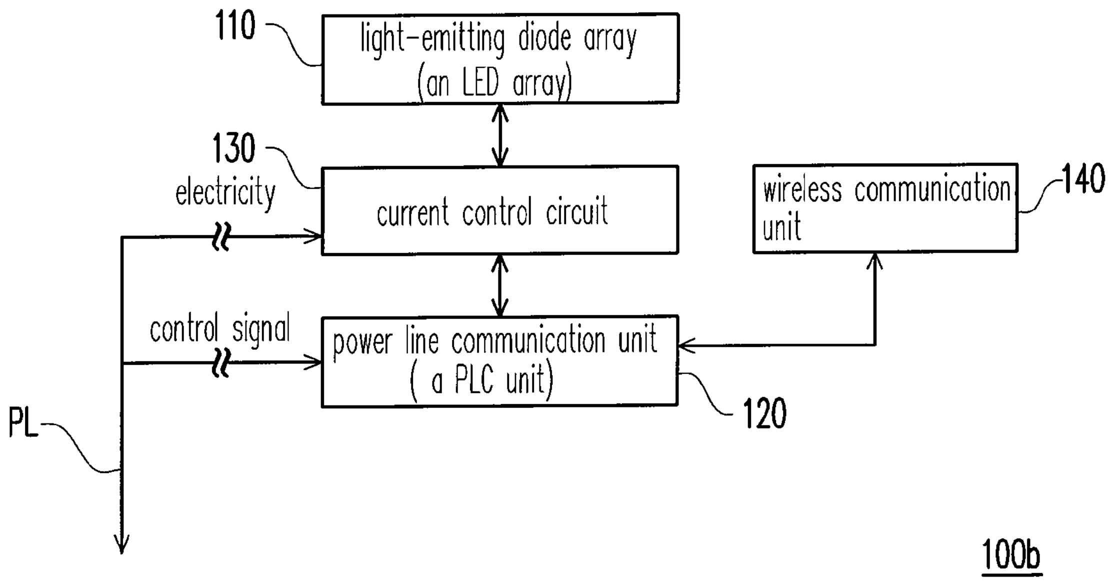
FIG. 4 is a schematic view illustrating an LED light source according to a third embodiment of the present invention.

FIG. 4 is a schematic view illustrating an LED light source according to a third embodiment of the present invention. Referring to FIG. 4, the LED light source 100*b* is similar to the LED light source 100 of the first embodiment. The main difference between the LED light source 100*b* and the LED light source 100 is that the LED light source 100*b* further comprises a wireless communication unit 140 and the wireless communication unit 140 is electrically connected with a PLC unit 120. According to an embodiment o the present invention, the wireless communication unit 140 includes an IEEE 802.15.4 ZigBee wireless communication unit or a worldwide interoperability for microwave access (WiMAX) wireless communication unit. Of course, the wireless communication unit 140 can also be a communication unit with other wireless communication protocols. The wireless communication unit 140 according to the present invention is not limited to the IEEE 802.15.4 ZigBee wireless communication unit or the WiMAX wireless communication unit.

Assuming that the LED light source 100*b* is installed in a street lamp or an indoor illumination device, when a monitored object wearing an IEEE802.15.4 ZigBee tag passes by the LED light source 100*b*, the IEEE 802.15.4 ZigBee wireless communication unit can monitor the monitored object. Therefore, the LED light source 100*b* having the IEEE 802.15.4 ZigBee wireless communication unit can be used to monitor movement of articles or people in the surroundings of the LED light source 100*b*. According to the description above, the LED light source 100*b* of the present embodiment having a function of logistics monitor and people movement monitor can be applied to a public safety monitoring system of a building, and thereby every LED light source 100*b* in the building can provide sufficient information for a rescue team to make a correct decision when an emergency (e.g. a fire) occurs, so as to achieve a purpose of a rapid rescue.

In addition, a plurality of the LED light sources 100*b* having the wireless communication units 140 can constitute a mesh wireless communication network, and thereby prevents a dead space of signal receiving in a monitoring scope of the wireless communication units 140.

Fourth Embodiment

Figure 5:
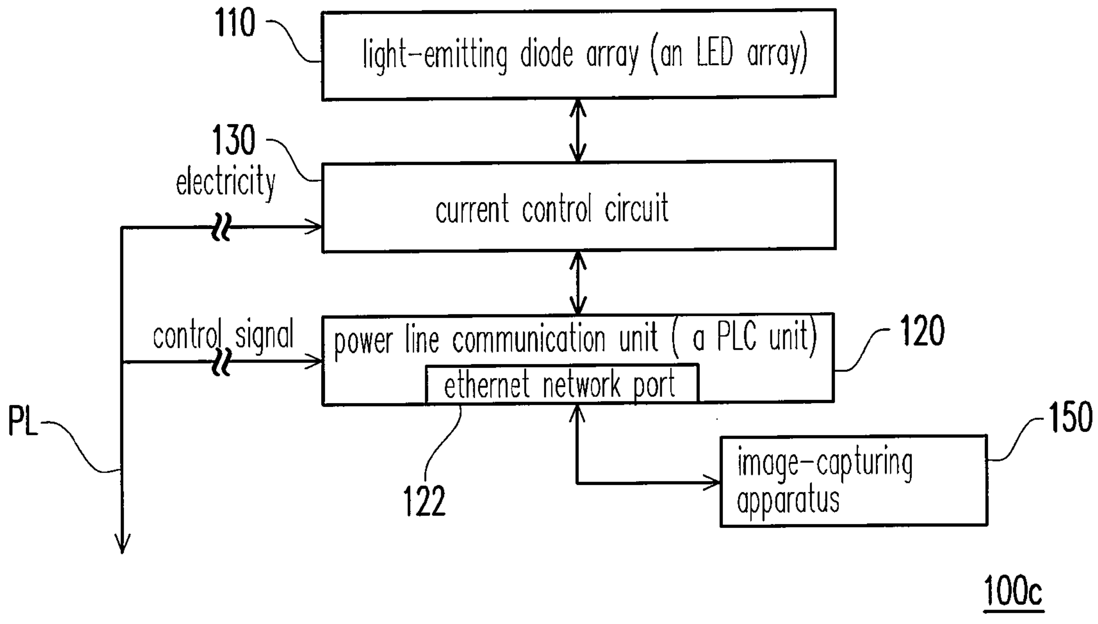
FIG. 5 is a schematic view illustrating an LED light source according to a forth embodiment of the present invention.

FIG. 5 is a schematic view illustrating an LED light source according to a forth embodiment of the present invention. Referring to FIG. 5, the LED light source 100*c* is similar to the LED light source 100 of the first embodiment. The main difference between the LED light source 100*c* and the LED light source 100 is that the LED light source 100*c* farther comprises an image-capturing apparatus 150 electrically connected with a PLC unit 120. In one embodiment of the present invention, the PLC unit 120 has an Ethernet network port 122, for example. The image-capturing apparatus 150 is an IP camera electrically connected with the Ethernet network port 122, for example.

When a resolution of an image captured by the IP camera is about 130 mega-pixels or about 200 mega-pixels, the PLC unit 120 can be an HD-PLC unit. The HD-PLC unit can transmit the image with a high resolution to the remote monitoring center by using a high transmission rate ranging from 42 Mbps to 72 Mbps.

All of the characteristics disclosed in the aforesaid embodiments can be incorporated with one another, and thereby the LED light source can possess multiple functions.

Fifth Embodiment

Figure 6:
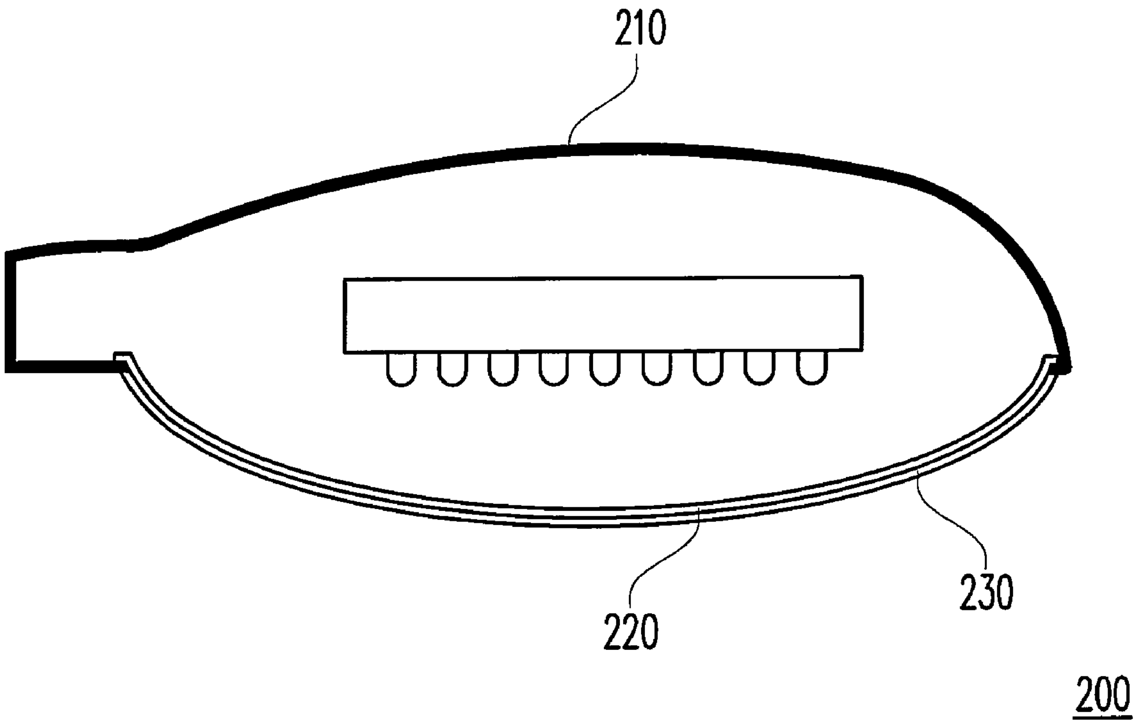
FIG. 6 is a schematic view illustrating an LED lamp according to the present invention.

FIG. 6 is a schematic view illustrating an LED lamp according to the present invention. Referring to FIG. 6, the LED lamp 200 of the present invention includes a housing 210, a plastic lampshade 220, a photocatalyst layer 230 and the LED light sources 100, 100*a*, 100*b*, 100*c* described in the aforesaid embodiments. The housing 210 and the plastic lampshade 220 are provided for accommodating the LED array 110, the PLC unit 120 and the current control unit 130 (as shown in FIGS. 1 to 5). The photocatalyst layer 230 is coated on the plastic lampshade 220.

Generally, a manual cleaning method is adopted on a regular basis to maintain cleanness of a street lamp, but the method is quite expensive. However, if using a photocatalyst for carrying out a self-cleaning method on the LED lamp, it is obstructed by a technical bottleneck which is the photocatalyst substance cannot be coated on a conventional glass lampshade smoothly. Therefore, the current street lamp uses the glass lampshade with good heat resistance, and the lampshade is usually cleaned by manual cleaning.

Compared with prior arts, the photocatalyst layer 230 can be coated on the plastic lampshade 220 easily is used in the present embodiment, so that the photocatalyst layer 230 can be integrated into the LED lamp. Because power and an operating temperature of the LED lamp 200 are lower than those of a high pressure sodium (HPS) lamp, the plastic lampshade 220 coated by the photocatalyst layer 230 can be used in the LED lamp 200 according to the present invention, and thereby overall weight and production cost are reduced significantly.

In summary, the LED light sources or the LED lamp according to the present invention can communicate with other LED light sources or other LED lamps through the power line. In addition, the LED light sources or the LED lamp according to the present invention can also transmit data to a remote monitoring center through the power line.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed description.

What is claimed is:

1. A light-emitting diode (LED) light source suitable for being electrically connected with a power line, the LED light source comprising:

an LED array;

a power line communication (PLC) unit electrically connected with the power line, the PLC unit receiving a control signal transmitted with electric power through the power line, wherein the PLC unit comprises a high definition PLC unit (HD-PLC unit);

an image-capturing apparatus electrically connected with the PLC unit; and a current control unit electrically connected with the power line, the LED array and the PLC unit, wherein the PLC unit controls the current control unit to selectively output driving and over-driving current to the LED array according to the control signal, so as to control the luminance of the LED array.

2. The LED light source according to claim 1, wherein the LED array comprises:

a carrier; and a plurality of LEDs arranged in an array on the carrier and electrically connected with the carrier.

3. The LED light source according to claim 2, wherein the carrier comprises a circuit board.

4. The LED light source according to claim 3, wherein the circuit board comprises a metal core printed circuit board.

5. The LED light source according to claim 3, wherein the PLC unit is integrated in the circuit board.

6. The LED light source according to claim 3, wherein the PLC unit is a power line communication chip electrically connected with the circuit board.

7. The LED light source according to claim 3, wherein the current control unit is integrated in the circuit board.

8. The LED light source according to claim 2, wherein the LEDs comprise surface mounted device (SMD) type packages or pin through hole (PTH) type packages.

9. The LED light source according to claim 1, further comprising a wireless communication unit electrically connected with the PLC unit.

10. The LED light source according to claim 1, wherein the PLC unit comprises an Ethernet network port, and the image-capturing apparatus comprises an internet protocol camera (IP camera) electrically connected with the Ethernet network port.

11. An LED amp suitable for being electrically connected with a power line, the LED lamp comprising:

an LED light source wherein the LED light source includes:

an LED array;

a power line communication (PLC) unit electrically connected with the power line, the PLC unit receiving a control signal transmitted with electric power through the power line, wherein the PLC unit comprises a high definition PLC unit (HD-PLC unit);

an image-capturing apparatus electrically connected with the PLC unit; and a current control unit electrically connected with the power line, the LED array and the PLC unit, wherein the PLC unit controls the current control unit to selectively output driving and over-driving current to the LED array according to the control signal, so as to control the luminance of the LED array;

a housing;

a plastic lampshade, wherein the housing and the lampshade are provided for accommodating the LED array, the PLC unit and the current control unit; and a photocatalyst layer coated on the plastic lampshade.

12. The LED lamp according to claim 11, wherein the LED array comprises:

a carrier; and a plurality of LEDs arranged in an array on the carrier and electrically connected with the carrier.

13. The LED lamp according to claim 12, wherein the carrier comprises a circuit board.

14. The LED lamp according to claim 13, wherein the circuit board comprises a metal core printed circuit board.

15. The LED lamp according to claim 13, wherein the PLC unit is integrated in the circuit board.

16. The LED lamp according to claim 13, wherein the PLC unit is a PLC chip electrically connected with the circuit hoard.

17. The LED lamp according to claim 13, wherein the current control unit is integrated in the circuit hoard.

18. The LED lamp according to claim 12, wherein the LEDs comprise SMD type packages or PTH type packages.

19. The LED lamp according to claim 11, further comprising a wireless communication unit electrically connected with the PLC unit.

20. The LED tamp according to claim 11, wherein the PLC unit comprises an Ethernet network port, and the image-capturing apparatus comprises an IP camera electrically connected with the Ethernet network port.

* * * * *